United States Patent
Brcka

(10) Patent No.: US 7,407,324 B2
(45) Date of Patent: Aug. 5, 2008

(54) METHOD AND APPARATUS FOR MONITORING THE THICKNESS OF A CONDUCTIVE COATING

(75) Inventor: Jozef Brcka, Loundonville, NY (US)

(73) Assignee: Tokyo Electron, Ltd., Tokyo (JP)

( * ) Notice: Subject to any disclaimer, the term of this patent is extended or adjusted under 35 U.S.C. 154(b) by 90 days.

(21) Appl. No.: 11/200,013

(22) Filed: Aug. 10, 2005

(65) Prior Publication Data

US 2007/0036198 A1 Feb. 15, 2007

(51) Int. Cl.
G01N 25/00 (2006.01)
G01K 19/00 (2006.01)

(52) U.S. Cl. .............................. 374/7; 374/1
(58) Field of Classification Search ............ 374/6, 374/7

See application file for complete search history.

(56) References Cited

U.S. PATENT DOCUMENTS

| | | | | |
|---|---|---|---|---|
| 4,513,384 A | * | 4/1985 | Rosencwaig ............... | 702/170 |
| 4,679,946 A | * | 7/1987 | Rosencwaig et al. ........... | 374/5 |
| 5,166,080 A | * | 11/1992 | Schietinger et al. ........... | 438/7 |
| 5,258,824 A | * | 11/1993 | Carlson et al. .............. | 356/632 |
| 5,893,050 A | * | 4/1999 | Park et al. ..................... | 702/97 |
| 6,178,390 B1 | * | 1/2001 | Jun ............................ | 702/170 |
| 6,283,630 B1 | * | 9/2001 | Yazawa ..................... | 374/128 |
| 6,534,975 B2 | * | 3/2003 | Beeck et al. ................ | 324/230 |
| 6,646,752 B2 | * | 11/2003 | Chen et al. ................. | 356/630 |
| 6,666,577 B2 | * | 12/2003 | Shibata et al. ............. | 374/141 |
| 7,204,639 B1 | * | 4/2007 | Gotkis et al. .................. | 374/7 |
| 2002/0031164 A1 | * | 3/2002 | Scheidt et al. ................. | 374/7 |

* cited by examiner

Primary Examiner—Gail Verbitsky
Assistant Examiner—Mirellys Jagan
(74) Attorney, Agent, or Firm—DLA Piper US LLP

(57) ABSTRACT

A method and apparatus for determining thickness of a metallic layer being deposited on a collector. The method includes applying an electromagnetic field to a conductive layer on the collector. Then the temperature or the change in temperature of the collector is determined. The metal thickness is determined as a function of the temperature or change in temperature. The apparatus includes a collector, a thermocouple associated with the collector, and a source of an electromagnetic field.

18 Claims, 5 Drawing Sheets

METHOD AND APPARATUS FOR MONITORING THE THICKNESS OF A CONDUCTIVE COATING

TECHNICAL FIELD

One use of the method and apparatus described herein relates to in-situ and ex-situ monitoring and determining the thickness of a conductive (e.g., metallic) layer deposited on chamber surfaces during a metallization process in semiconductor technology.

BACKGROUND

During fabrication of microelectronic devices, thin films and metal alloys are deposited on substrates and used as electrical conductors, adhesion layers and diffusion barriers. For instance, the ionized physical vapor deposition (iPVD or ionized PVD) process has been utilized in semiconductor processing for metallization and forming interconnects. Other techniques are used for metallization, for example, chemical vapor deposition (CVD) and atomic layer deposition (ALD) processes. These techniques are utilizing metallic precursors to deposit a metallic layer over the structure. In many cases these methods use plasma source techniques to ionize and excite gas and precursors, since it has been found to be an effective and simple tool to generate high-density plasma (for instance, plasma enhanced CVD, referred to as PECVD, and plasma enhanced ALD, referred to as PEALD).

Typically, the metallization PVD process is performed in a vacuum chamber by creating the metal vapor flux from the metal source (usually a magnetron sputtering source, evaporation source, precursors, etc.). The metal atoms may be transported directly to the substrate or undergo thermalization within a processing zone, depending on the background argon pressure. Eventually, the metal is ionized by a secondary plasma source to provide metallic ions for required process performance. Metal ions and atoms are diffusing towards the wafer surface and ions are accelerated by sheath voltage (potential difference between plasma and wafer potential). Concurrently with this process the metal (either neutral or in ionic state) is transported to other hardware surfaces in the chamber as well, since the processing zone is always surrounded and enclosed by the chamber walls, shields, secondary plasma source interfacing surface, etc. Thus the metal is also ultimately deposited onto the chamber wall and hardware surfaces. This might have an effect on tool performance and mean time before maintenance (MTBM).

SUMMARY OF THE INVENTION

The present disclosure relates to a method for monitoring and determining the thickness of a generally conductive layer deposited on a collector.

The present disclosure also relates to an apparatus for monitoring and determining the thickness of a generally conductive layer deposited on a collector.

The present method and apparatus monitor and measure conductive layer (metal) thickness based upon changes in temperature change due to the amount of heat generated within a deposited conductive layer when exposed to a RF field.

BRIEF DESCRIPTION OF THE DRAWINGS

The accompanying drawings, which are incorporated in and constitute a part of the specification, illustrate a non-limiting embodiment of the method and apparatus for monitoring and determining conductive layer thickness. The drawings, together with the general description given above and the detailed description to follow, aid in an understanding of the method and apparatus for monitoring and determining conductive layer thickness. In the accompanying drawings, like reference numerals identify corresponding components.

DETAILED DESCRIPTION OF SEVERAL EMBODIMENTS

The following detailed description is given in the non-limiting context of an iPVD deposition process, in which a layer or film of conductive material is to be deposited on a workpiece. In this context, the method and apparatus are utilized to monitor and determine the thickness of a metal layer deposited on an internal surface of the deposition chamber (e.g., the chamber wall) using temperature change which is a function of the heat absorbed within the metal coating deposited on the internal surface.

Figure 1:
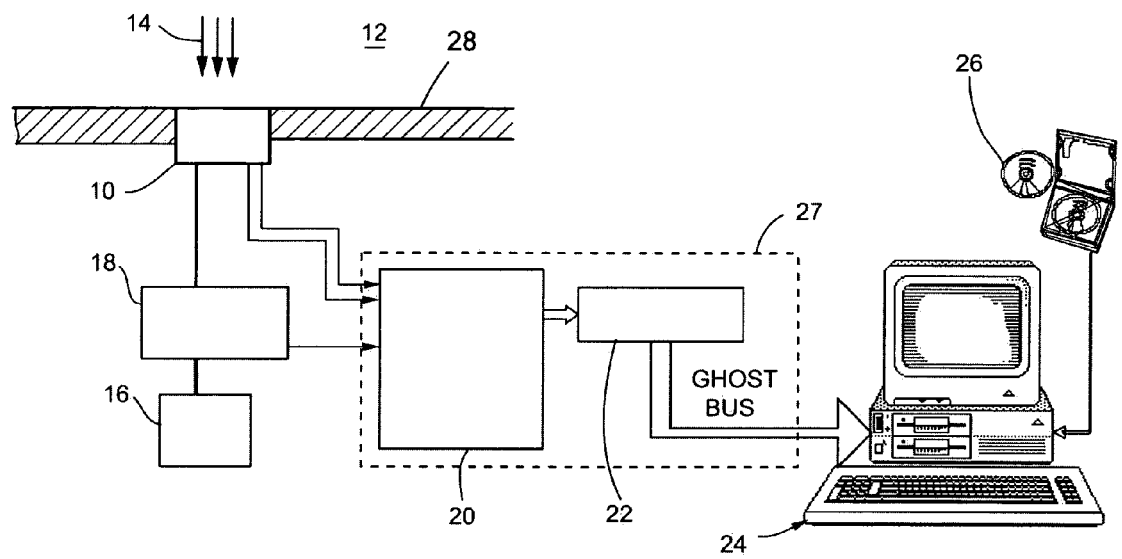
FIG. 1 is a simplified block diagram of hardware and software which can be used for monitoring and determining conductive layer thickness.

With reference to FIG. 1, a thickness monitoring device 10, which will be described in greater detail hereinafter, is positioned in the processing zone 12 of a deposition chamber. The arrows 14 represent metal material within the processing zone 12. A RF generator 16 provides an electromagnetic field to heat the conductive layer deposited on the monitoring device 10. The output from the RF generator is connected to the monitoring device through a conventional impedance matching device 18. The impedance match and RF generator may be controlled by I/O (input/output) circuits 20, 22, such as those marketed by TEL (Tokyo Electron, Limited), the assignee of the present application, as part numbers 3M93-029225-13 and 3M81-027471-12, respectively. The I/O circuits are also connected to a computer-controller 24 such as a Dell Precision Workstation 610. The computer-controller 24 may, of course, be a general purpose computer system that performs a portion or all of the microprocessor based processing steps described herein in response to a processor executing one or more sequences of one or more instructions contained in memory. Such instructions may be read into the computer memory from a computer readable medium, such as a hard disk or a removable media drive. One or more processors in a multi-processing arrangement may also be employed as the controller microprocessor to execute the sequences of instructions contained in main memory. In alternative embodiments, hard-wired circuitry may be used in place of or in combination with software instructions. Thus, implementation of the monitoring and measuring of the thickness of the conductive layer is not limited to any specific combination of hardware circuitry and software. In one embodiment, the instructions are part of a thermal simulation code indicated as being on a CD ROM 26 and may be run in real time, simultaneously with the monitoring of the thickness of the conductive layer on the monitoring device 10. This allows for correlating predicted values to actual values and thus permits, inter alia, deferral of preventative maintenance procedures to the extent that they can safely be deferred without impairing performance. The monitoring device 10 does not disturb the deposition taking place within the processing zone 12, since the RF signal from RF generator 16 is low enough to only heat the components of the device 10 without interfering with the actual deposition on the wafer or workpiece.

The temperature is measured with a thermocouple as will be hereinafter explained, and data from the thermocouple are collected using an interface and the computer 24. The monitoring device 10 may be incorporated in a portion of the deposition chamber wall 28 or even within the active components of the deposition system, since it is insulated both thermally and electrically (RF) from the deposition system.

Figure 2:
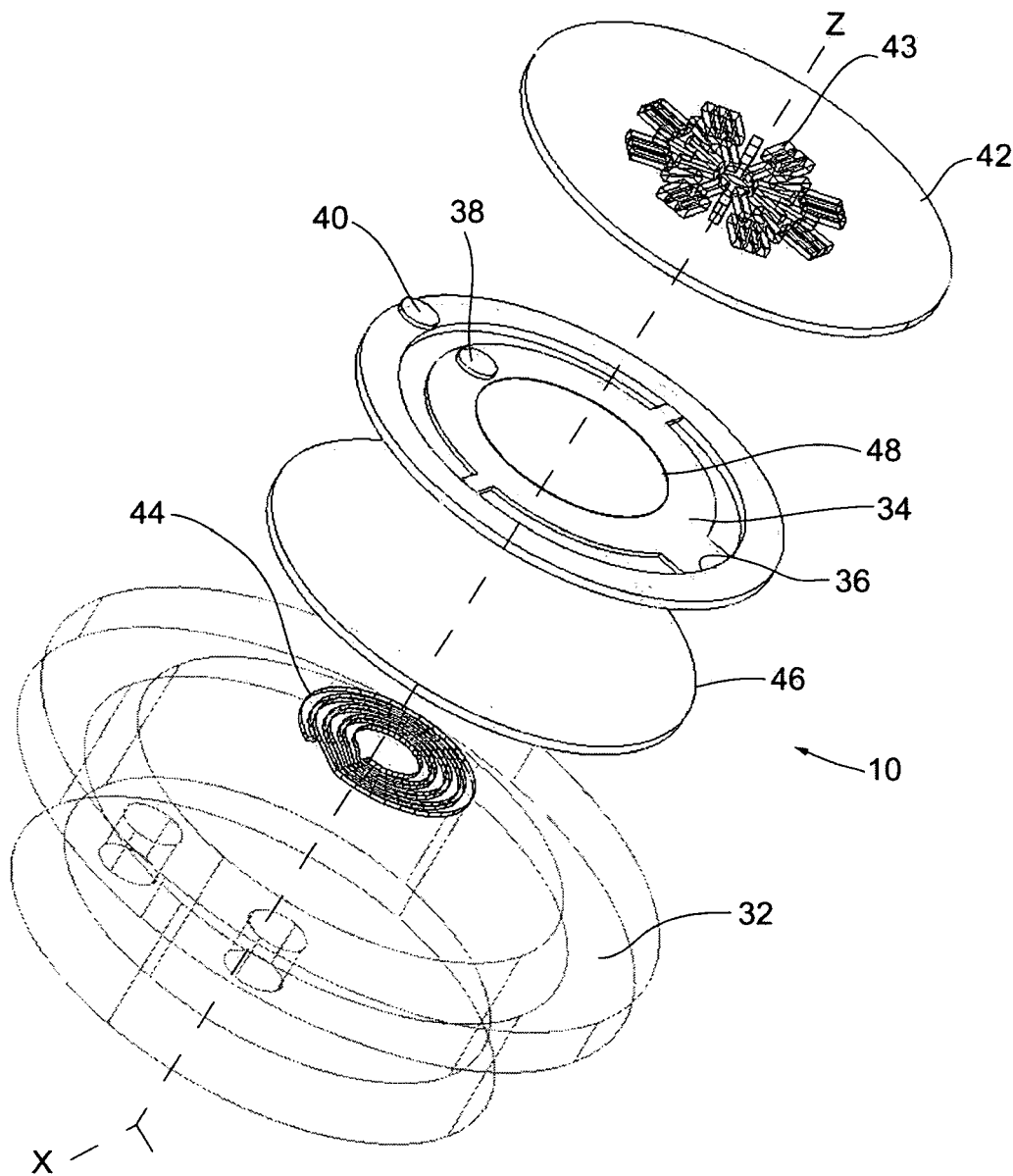
FIG. 2 is an exploded illustration of a portion of the apparatus for monitoring and determining conductive layer thickness.

With the foregoing as an overview of the system, reference should be had to FIG. 2 for a more detailed description of the monitoring device 10, which includes a metal collector and a thermocouple which may be used to provide instant readings of the collector temperature. As will be explained in greater detail, any increase in the RF field induced collector temperature is a measure of the volumetric heat of the conductive layer coating on the collector at constant ohmic power loss density, and thus is a measure of increased coating thickness.

In FIG. 2, the components of the monitoring device 10 are illustrated in an exploded view for clarity and ease of understanding but in a non-limiting illustration components are positioned within a cover 32. Further, in the non-limiting illustration of FIG. 2, the components are of generally circular configuration in plan view and are generally aligned along a common axis. A collector 34 of thin, flat, circular configuration, is secured to the interior circumference of a thin, flat, annular electrode 36 which may be referred to as a reference or cooling electrode. The collector, or substrate, is preferably made of ceramics. The collector and electrode 34, 36 are connected together in a single plane. Two thermocouples 38, 40 are provided on the collector 34, and the electrode 36, respectively. These thermocouples may be referred to as the active and reference thermocouples. The reference thermocouple is used to measure the temperature of the reference electrode and the active thermocouple is used to measure the temperature of the collector.

A thin, flat, circular protective shield 42 is axially aligned on one side of the collector 34. The shield 42 includes a series of apertures 43 therethrough. Metal flows through the apertures in the shield to be deposited on the collector 34. The relative alignment of the apertures, collector and electrodes are such that the shield prevents the metal from reaching the reference electrode 36. Furthermore, the protective shield 42 serves to protect the collector 34 from direct irradiation by ions and UV from the plasma in the deposition chamber, and serves as a thermal shield. The apertures 43 in the shield allow a reasonable amount of the metal material which is being sputter deposited but do not reach the workpiece, to penetrate through the shield 42 and be deposited on the collector 34. This amount corresponds generally to the amount of metal material which would be deposited on the wall of the chamber. The placement of the apertures and alignment of the shield relative to the reference electrode protects the reference electrode and thermocouples—thus material (metal) is deposited on the collector of the monitoring device but not on the reference electrode or the thermocouples.

As an iPVD metallization tool is used, there might be deposited a significant amount of the material on the internal surfaces within the chamber. The total thickness of deposited film on the collector 34 is a function of the metal or film which is deposited on other exposed surfaces within the chamber. Thus the shield 42 may serve as calibration or adjusting means to deposit only a reasonable amount of the conductive material on the collector. The term "reasonable amount" is to indicate that the collector should have a sufficient useful life without limiting its sensitivity to very small increments of conductive layer thickness. This may be established by experimentation and calibration of the system within the chamber it will be used to monitor. The shield 42 also protects against direct RF exposure in the chamber to avoid plasma ignition with processes that do not use plasma in the chamber, such as CVD or ALD. In PECVD or PEALD the shield 42 does not need to perform this last function. The geometry and physical characteristics of the shield 42 may depend on the chemistry and conditions within the chamber. The shield may be made of metals (Al, Cu, etc.) but also from ceramic materials ($Al_2O_3$, AlN, SiC, etc.) or for low temperature applications even Teflon based materials.

On the side of the collector 34 opposite from the shield 42 is an exciter 44. An insulating shell 46 is positioned between the exciter and the collector.

The collector 34 may be made from dielectric material to be transparent to RF fields generated by the exciter 44 and having a very low dissipation factor to exclude any contribution of the dielectric loss within the collector to additional heating of the collector. Typical applicable materials are $Al_2O_3$, AlN, SiC, quartz or other low dissipation ceramic materials. The choice of the particular material will have an effect on a response amplitude and time delay of temperature readings from the active thermocouple 38, and should be considered within an actual geometry of the collector design. Based on simulation results (to have adequate temperature readings by amplitude and time response, for example, for measured thickness around 1 µm range) in the illustrated exemplary configuration of the system, the dimensions of the collector can be a diameter (Ø) of about 10—about 30 mm, a thickness of about 0.1—about 0.5 mm, and a disk (circular) shape. A rectangular shape may also be used and thus the collector 34 is not limited to the precise geometry illustrated in the drawings. Some additional criteria may apply when the collector serves also as a mechanical barrier or when there are reactive gases in the chamber (vacuum-atmosphere wall, chemical resistance to particular process, film adhesion, etc). Thus the collector may be constructed of a combination of two or more ceramic materials. To more quickly measure or assess the information about temperature within the collector, a thermal bridge between the collector 34 and reference electrode 36 can be made of SiC (or AlN). In this regard it is to be noted that SiC and AlN have significantly greater thermal conductivity compared to that of $Al_2O_3$.

The thin, flat collector 34 is positioned on the side of the thermally insulating shell 46 opposite from the RF exciter 44. The collector contains the active thermocouple 38 to provide measurement of the actual temperature of the collector. For frequent in-situ readings the collector should be provided with a well-controlled cooling or reference electrode 36. This will allow the collector to be reset or to return to the initial temperature quickly. Thus electrode 36 may be considered a "sink" electrode which, depending upon the material and geometry used, will in a well-defined manner remove heat flux from the collector.

The exciter 44 is an inductive exciter positioned on the opposite side of the collector 34 from the side which is exposed to the plasma. The exciter creates an electromagnetic field which induces a current in any metal deposited on the collector. The build-up of metal deposited on the collector is reflected in proportional ohmic losses in the current which, in turn, is reflected in relative changes in temperature. For illustrative purposes, it may be appreciated that metal material has flowed through the openings 43 in the shield 42 and has been deposited as a film 48 on the collector 34. When exciter 44 is energized, ohmic losses resulting from currents induced in the metal layer cause a change in temperature measured by thermocouple 38 compared to the reference temperature of reference thermocouple 40.

The exciter 44 is typically a miniature inductor coil (circular or other shape) with an inductance of about 0.1—about 0.5 μH. It is powered from the RF generator 16 (FIG. 1) and generates RF radiation at the deposited film 48. Because some of the RF energy will be lost within the exciter material, the exciter can be separated from the collector 34. The absence of such contact will reduce the effect that the exciter material itself will have on the temperature readings. A suitable material to avoid such contact between the exciter 44 and the collector 34 would be air (i.e., an air gap) or a thin Teflon sheet.

Alternatively, exciter 44 can be replaced with another source of an electromagnetic field. One possible example is the electromagnetic field produced in deposition chamber itself.

The active thermocouple 38 is attached to or immersed into the collector material, but not in a direct RF irradiation path of exciter 44 to reduce the heat developed within the thermocouple on the collector, from the exciter 44, thus reducing the influence of RF heating on the thermocouple readings. The thermocouple can be mechanically embedded into collector body, sintered with ceramic material or attached by appropriate thermally conductive glues. Thermocouple 38 provides instant readings $T_t$ of the collector temperature. To determine actual temperature changes, temperature readings $T_{ref}$ from reference thermocouple 40 are compared with readings from active thermocouple 38 utilizing the interface 27, the computer 24 and the evaluating code or software. The evaluating code or software, which may be referred to as a thermal simulation code, can run in real time simultaneously with the monitoring process to correlate predicted temperature values to actual ones, and interpreting this difference as being related to the thickness of the film 48 deposited on the collector 34.

The metal thickness monitoring device can be manufactured either from individual components as described above or based on MEMS technology integrating into the device known temperature sensors, RF inductive components, cooling means, etc.

The thermocouples may determine temperature differentials at discrete times or on a continuous basis. Thus the thickness of the film 48 may be determined on a real time basis.

The theoretical background for evaluating the thickness of the film 48 built up on the collector 34 as a function of change in temperature will now be explained. The metal thickness-monitoring device operates on the following principles. The monitoring device is exposed to the processing space through the shield 42. The metals from processing space diffuse towards the device and are deposited onto the collector surface. When no metal is present at the surface of collector 34, the RF inductive exciter acts as a heat source due to dielectric loss only within the collector body. However, typical dielectric losses, for example in an alumina collector, are very small (dissipation factor~0.00033) and only a minimal temperature increase occurs. When a metallic coating is deposited on the collector surface, the RF electromagnetic field from the exciter causes additional ohmic loss within the deposited layer. The temperature of the coating is increased under the RF inductive load and heat transfer occurs from the metallic coating towards the collector body. The active thermocouple 38 (which also may be referred to as a probe or active probe thermocouple) will provide instant readings of the temperature increase. The increase of the temperature is a measure of the volumetric heating of the coating at constant ohmic power loss density, thus a measure of increased coating thickness, considering that the exposed (deposited) collector area has not changed during monitoring.

The increase in temperature is proportional to the total ohmic power loss within the deposited metallic coating. At the excitation frequency used, the RF electromagnetic fields penetrating into the collector are attenuated significantly within the skin depth causing currents and conversion of the electromagnetic energy into heat. For example, at a frequency $f_0$=13.56 MHz, the skin depth in a Cu conductor is about 17.4 μm, and the amplitude of the RF magnetic field decreases with the depth x by the factor $e^{-x/\delta}$, where the constant δ is called skin depth and is given by relation $$\delta = \sqrt{\frac{2}{2\pi f_0 \sigma_m \mu_0}} \quad (1)$$

$\sigma_m$ is the coating material conductivity, $f_0$ is the frequency of the inductive exciter and $\mu_0$=4π×10$^{-7}$ H/m is magnetic permeability). The thickness of the coating on a collector within the chamber is typically much less than skin depth—from hundreds of nanometers to several micrometers. This means that the ohmic losses will not saturate within the coating and the ohmic losses will depend on an actual thickness of the coating. At constant power supplied to the exciter and the same coating thickness, the larger ohmic losses will be generated by a lower frequency source (for a metal coating thickness larger than skin depth), which means that method resolution and sensitivity will increase with reduction of the frequency. The measured metallic thickness range is from 10's nm to 10's μm. The choice of the applied frequency plays a role in an optimization of the monitor response in a particular application as an adjustment to expected metal film thickness. Using frequency scanning techniques, the thickness of the film at more than skin depth can be determined.

Another control parameter is the probing time and duty factor. Duty factor is the period through which the RF signal has been repeatedly applied to an inductive exciter. The monitoring device, depending upon its structure, can operate in static (steady state) or dynamic mode. To achieve steady state temperature in a short time cooling (or reference) electrode 36 controls the removal of heat flux and allows also resetting the device quickly to an initial temperature. Since for an actual monitoring device the thermal structure is fixed, then at the same RF power supplied to the inductive exciter 44, the temperature change will depend only on the thickness of the coating and reference temperature (or heat flux to the reference electrode) and can be assessed at steady state conditions. In the dynamic mode, $\Delta T/\Delta t$ is measured (where $\Delta T$ represents the change in temperature over period of time $\Delta t$). With other parameters (excitation frequency, power and reference temperature) constant, the temperature change will depend only on the deposited layer thickness and can be assessed from the slope and initial temperature value.

Because the monitoring device is relatively simple in structure, the thermal simulation code can run in real time simultaneously with the monitoring process. The code may include inputs from the tool, to provide correction to operating pressure, process temperature, etc. Knowing thermal specifications and instant response of the thermocouples, the instant deposition rate can be estimated on a real time basis.

The monitoring device can operate in-situ with a process running (e.g., during the deposition processing of a wafer), or operate ex-situ at an off-process period, taking data during wafer handling or tool idle time. It is also feasible to prepare samples at the tool (deposit metal coatings on a disassembled collector from the device) and determine thickness of thin film outside of the tool. For this purpose a removable replaceable collector 34 can be used and then assembled into a sensor and the metal thickness evaluated. Alternatives include determining the change in thickness in respect to the initial thickness on a removable collector.

The mathematics supporting the conclusion that the change in temperature is a reliable indication of thickness of the conductive layer will now be explained in greater detail. Neither the electric field (E) nor the magnetic field (H) penetrates far into a "good" conductor. The point where these fields are reduced by a factor of $1/e \approx 1/2.71$ is called the skin depth. Skin depth $\delta$ is dependent on metal properties in the conductor and the frequency of the fields applied to the conductor. At high frequencies the skin depth is very shallow, and the fields are often considered to be zero in a few millimeters. For example, in radio frequency range from 10 MHz to 100 MHz a skin depth is in the micrometers range. A general rule is that at five times the skin depth, the fields can be considered to be zero (the actual value is $(1/e)^5 \approx 0.674\%$; which is, indeed, quite small) and all ohmic power loss occur within this skin depth.

Generally the skin depth formula is valid for frequencies below several hundred GHz. A more precise value can be found by insuring the following conditions are met: $f_o << \sigma_m/\epsilon_0$ and $f_0 << 1/\tau$, where $\tau = \epsilon_0 m_e/Ne^2$, ($\epsilon_0 = 8.85 \times 10^{-12}$ As/(Vm) is the permittivity of free space, $\sigma_m$—conductivity of metal, $m_e$—electron mass, e—electron charge, $N = \rho_0 N_A V_A/m_\alpha$ is atomic density, $\rho_0$—metal density, $N_A$—Avogadro's number, $V_A$—mole volume (22.4 liters), $m_A$—the metal atomic weight, and conductivity $\sigma_m = 1/\rho_m$, where $\rho_m$—is the resistivity of the metal).

The ohmic power loss density $u(x)$ per volume unit depends on current density and conductivity $\sigma_m$ of conductor material exposed to the RF fields for depths comparable to the skin depth $x \approx \delta$ according to the formula $$u(x)_{x \approx \delta} = \frac{j(x)^2}{\sigma_m} \approx \frac{j_0^2(e^{-x/\delta})^2}{\sigma_m} \tag{2}$$

($j(x)$ is the current density at depth x and $j_0$ is the current density at the surface). The expression for total ohmic power loss U (delivered through a unit area of the collector) assuming exponential dependence of the current in a thin film with thickness $d_0$ has form (integrating formula (1) above over the volume of the film)

$$U_{x \approx \delta} = \int_0^{d_0} u(x) dx = \frac{j_0^2 \delta}{2\sigma_m}(1 - e^{-2d_0/\delta}) \tag{3}$$

The metal thickness monitoring device can measure significantly smaller thicknesses of the metal film than the skin depth. Current density is increasing exponentially, towards the surface of the metal film and is practically zero at a depth of several "skin depths" relative to the bulk of a conductor. For thicknesses smaller than skin depth, that is $x << \delta$, there is a reduction in current density proportional to thickness of the metallic thin film, that is:

$$j(x) = j_0 \exp(-x/\delta)|_{x << \delta} \approx j_0(1 - x/\delta) \tag{4}$$

and ohmic power loss density $u(x)_{x << \delta}$ is given by $$u(x)_{x << \delta} = \frac{j(x)^2}{\sigma_m} \approx \frac{j_0^2(1-x/\delta)^2}{\sigma_m} \tag{5}$$

Integrating over the film thickness, the total ohmic power loss $U_{x << \delta}$ in the film exposed to RF radiation will be $$U_{x << \delta} = \int_0^{d_0} u(x) dx \tag{6}$$

$$\approx \frac{j_0^2}{\sigma_m} \int_0^{d_0} \left(1 - \frac{x}{\delta}\right)^2 dx$$

$$= \frac{j_0^2}{3\sigma_m}\left[1 - \left(1 - \frac{d_0}{\delta}\right)^3\right]$$

which exhibits a cubic (third power) dependence of the ohmic power loss on the film thickness. For extremely thin films the ohmic power loss varies linearly with film thickness and in a limiting case is equal to zero (very thin metallic coating).

$$U_{x \to 0} \approx \frac{j_0^2 d_0}{\sigma_m} \tag{7}$$

Film resistivity depends also on the temperature, and as a first approximation formula (8) is used $$\rho_m(T) = \rho_{0m}(1 + \alpha \Delta T) \tag{8}$$

This formula (8) defines the metal resistance at a given temperature, where $\rho_m(T)$ is the resistivity at temperature T; $\rho_{0m}$ is the metal's resistivity at 20° C., $\alpha$ is the coefficient of resistivity and $\Delta T$ is the temperature difference of temperature T in the position of an active probe from 20° C., that is $\Delta T = T_{active\_probe} - 20$.

Combining formulas or relationships (3) and (8) results in the derivation of ohmic loss dependence on the film thickness for coating thickness $x \approx \delta$ and the effect of the actual temperature increase within a thin film and formally given by function $\psi(d_0, f_0, \Delta T)$, that is the following (9):

$$U_{x \approx \delta} = \frac{1}{2} j_0^2 \delta \rho_{0m}(1 + \alpha \Delta T)(1 - e^{-2d_0/\delta}) \tag{9}$$

$$= \frac{j_0^2 [\rho_{0m}(1 + \alpha \Delta T)]^{3/2}}{2\sqrt{\pi f_0 \mu_0}}\left(1 - e^{-2d_0 \sqrt{\frac{\pi f_0 \mu_0}{\rho_{0m}(1 + \alpha \Delta T)}}}\right)$$

$$= \psi(d_0, f_0, \Delta T)$$

For x<<δ (film thickness less than skin depth) formula or relationship (6) above may be rewritten in the form:

$$U_{x<<\delta} = \int_0^{d_0} u(x)dx \approx \frac{1}{3} j_0^2 \delta \rho_{0m}(1+\alpha\Delta T)\left[1-\left(1-\frac{d_0}{\delta}\right)^3\right] \quad (10)$$

or, after substitution instead of the skin depth, use or formula (1), the total ohmic power loss per unit area will be:

$$U_{x<<\delta} \approx j_0^2 \frac{\rho_{0m}(1+\alpha\Delta T)}{\sqrt{9\pi f_0 \mu_0}}\left[1-\left(1-d_0\sqrt{\frac{\pi f_0 \mu_0}{\rho_{0mm}(1+\alpha\Delta T)}}\right)^3\right] \quad (11)$$

$$= \psi(d_0, f_0, \Delta T)$$

For completeness, in the limiting case x→0 the following expression does not depend on excitation frequency:

$$U_{x\to 0} \approx j_0^2 d_0 \rho_{0m}(1+\alpha\Delta T) = \psi(d_0, \Delta T) \quad (12)$$

The factors $\rho_{0m}$, $\alpha$, $\mu_0$ are constants given by the material properties of the deposited film, as described above, and in fact, ohmic power loss is a function of the film thickness, RF frequency and film temperature change. Based on the relationship (12) increased film thickness will generate larger ohmic power loss in the film, thus increasing the temperature of the film. Due to the high thermal conductivity of the metallic material, the heat flux will flow to the collector and generate temperature difference ΔT between probing (active) thermocouple 38 and thermocouple 40 (assuming that the temperature of the reference electrode is maintained at 20° C.).

Knowing the measured temperature difference from 20° C. $\Delta T=g_1(t)=T_{active\_probe}(t)-20$ and temperature change rate $$\frac{\Delta T}{\Delta t} = g_2(t) = \frac{[T_{active\_probe}(t+\Delta t) - T_{active\_probe}(t)]}{\Delta t}$$

based on data from the thermocouples 38, 40 and the actual device geometry and structure, the actual ohmic power loss density may be derived from the solution of the thermal equation $$\rho_0 c_p \frac{\partial T}{\partial t} = \vec{\nabla}\left(K\left(\vec{\nabla}T\right)\right) + A\psi(d_0, f_0, \Delta T) \quad (13)$$

where A is the area of a collector, $\rho_0$ is metal density, $c_p$ is specific heat (or heat capacity, K is thermal conductivity, $\vec{\nabla}$ is a vector differential operator "nabla"

$$\vec{\nabla} \equiv \left(\frac{\partial}{\partial x}, \frac{\partial}{\partial y}, \frac{\partial}{\partial z}\right)$$

in Cartesian coordinates, and applied to scalar T-field giving temperature gradient $$\vec{\nabla}T = \left(\frac{\partial T}{\partial x}, \frac{\partial T}{\partial y}, \frac{\partial T}{\partial z}\right) = grad(T).$$

When considering that thermal conductivity does not depend on temperature the first member on the right hand side of equation (13) is $$\vec{\nabla}\left(K\left(\vec{\nabla}T\right)\right) = K\left(\frac{\partial^2 T}{\partial x^2} + \frac{\partial^2 T}{\partial y^2} + \frac{\partial^2 T}{\partial z^2}\right) = div[grad(T)].$$

Using the measured relations $\Delta T=g_1(t)$ and $\Delta T/\Delta t=g_2(t)$ the following partial differential equation (13-a) has to be solved.

$$\rho_0 c_p g_2(t) = \vec{\nabla}(K\vec{\nabla}T) + A\psi(d_0, f_0, g_1(t)) \quad (13\text{-a})$$

This can be done directly using various numerical methods and techniques utilized as the evaluation code 26. There are many commercial software packages utilizing thermal solvers, for example, Maxwell 3D with e-Physic module by Ansoft Corp., FemLab 3 Multi-Physics Modeling software package Heat Transfer Module by Comsol, Inc., and Macsyma PDEase 2D software by Macsyma, Inc., which can provide 3D or 2D, steady-state or transient solutions for arbitrary geometry. Conventional programming can use mathematical software packages designed for technical computing such as Mathematica 5.1 (Wolfram Research, Inc.), Matlab (The MathWorks, Inc.), Maple (MapleSoft, Inc.) or other programming languages to solve the above equations as explained, for example, in Humphries, S., Field solutions on computers, CRC Press LLC (1998) and Arfken, G. B. and Weber H. J., Mathematical methods for physicists, 4th edition, Academic Press, (1995).

In principle, an initial computing of the homogeneous partial differential equation of the homogenous equation (that can be actually solved analytically for simple geometries such as planar circular or rectangular collector shape) in a form of trigonometric or Bessel functions $$\vec{\nabla}K(\vec{\nabla}T) = 0 \quad (13\text{-b})$$

will be sufficient to correlate temperature in the position of the active thermocouple $T_{active\_probe}$ with overall temperature distribution T=T(x, y) (in Descartes coordinates system) or T=T(r,φ) (in polar coordinates) on the collector, that is $T_{active\_probe}=c_0 T(x,y)$, where $c_0$ is a calibration constant for relating measured and simulated temperature readings in the position of probing thermocouple, and it should be in limit $c_0 \to 1$ when minimizing by design all parasitic heat transfer effects in a realistic (physically real) device. In fact, it will be just below "1" in a well optimized device, e.g. $c_0 \lesssim 1$.

Equations (13) or (13-a) can be solved using a simplification procedure (although differentiation from the direct numerical solving may impact the degree of precision of the results) as follows:

a) Case $x \approx \delta$

Substituting an expression for ohmic power loss from equation (9) into equation (13-a)

$$\rho_0 c_p g_2(t) = \vec{\nabla}\left(K\vec{\nabla}T\right) + \frac{j_0^2 A[\rho_{0m}(1+\alpha g_1(t))]^{3/2}}{2\sqrt{\pi f_0 \mu_0}}\left(1 - e^{-2d_0\sqrt{\frac{\pi f_0 \mu_0}{\rho_{0m}(1+\alpha g_1(t))}}}\right) \quad (14)$$

results in an equation that has to be solved for variable $d_0$. This may be accomplished using a numerical approach. By using the simplifying assumption that the temperature distribution $T(x,y)=\text{const} \approx T_{active\_probe}$ inside the collector area (i.e., the gradient of temperature is $\vec{\nabla}=0$) the solution of the equation for film thickness is given by relationship $$d_0 = \frac{1}{2}\sqrt{\frac{\rho_{0m}(1+\alpha g_1(t))}{\pi f_0 \mu_0}} \ln\left\{\left[1 - \frac{2\sqrt{\pi f_0 \mu_0}\,\rho_0 c_p g_2(t)}{j_0^2 A[\rho_{0m}(1+\alpha g_1(t))]^{3/2}}\right]^{-1}\right\} \quad (14\text{-a})$$

The temperature change and rate of this change are sampling in time instances $t_i$, $\{i=0, \ldots, n\}$, where $i=0$ relates to the beginning of the monitoring process and $i=n$ relates to the end, so $$g_1(t_i) = T_{active\_probe}(t_i) - 20$$

and $$g_2(t_i) = \frac{\lfloor T_{active\_probe}(t_{i+1}) - T_{active\_probe}(t_{i-1})\rfloor}{t_{i+1} - t_{i-1}}.$$

b) Case $x \ll \delta$. A simpler equation is achieved when $x \ll \delta$, where substituting equation (11) into (13-a) results in equation (15)

$$\rho_0 c_p g_2(t) = \vec{\nabla}\left(K\vec{\nabla}T\right) + j_0^2 A\frac{\rho_{0m}(1+\alpha g_1(t))}{\sqrt{9\pi f_0 \mu_0}}\left[1 - \left(1 - d_0\sqrt{\frac{\pi f_0 \mu_0}{\rho_{0m}(1+\alpha g_1(t))}}\right)^3\right]. \quad (15)$$

Assuming for simplicity again that the temperature distribution $T(x,y)=T_{active\_probe}=\text{const}$ inside the collector area, then $$d_0 = \sqrt{\frac{\rho_{0m}(1+\alpha g_1(t))}{\pi f_0 \mu_0}}\left\{1 - \left[1 - \frac{\rho_0 c_p g_2(t)\sqrt{9\pi f_0 \mu_0}}{j_0^2 A \rho_{0m}(1+\alpha g_1(t))}\right]^{1/3}\right\} \quad (16)$$

c) Case $x \to 0$. The simplest solution for power loss in the limiting case for very thin coatings was derived in equation (12). Repeating the procedure in the preceding two paragraphs, the following relationship is derived from equation (13-a):

$$\rho_0 c_p g_2(t) = j_0^2 \rho_{0m}(1+\alpha g_1(t))d_0 A \quad (17)$$

from which $$d_0 = \frac{\rho_0 c_p g_2(t)}{j_0^2 \rho_{0m}(1+\alpha g_1(t))A} \quad (17\text{-a})$$

Based on the foregoing, the film thickness can be evaluated from the temperature measurement. The metal coating thickness in dynamic mode can be determined in the most generic form by relation (14-a) and is valid for all ranges of film thickness. For thinner coatings one can use formula (16) and for extremely thin coatings formula (17-a), as illustrated in the following Table 1.

TABLE 1

Relations for metal coating thickness determination in dynamic mode of the operation.

| Metal coating thickness to skin depth relation | DYNAMIC MODE Relation for thickness determination | Relation # |
|---|---|---|
| $x \approx \delta$ | $d_0 = \frac{1}{2}\sqrt{\frac{\rho_{0m}(1+\alpha g_1(t))}{\pi f_0 \mu_0}} \ln\left\{\left[1 - \frac{2\sqrt{\pi f_0 \mu_0}\,\rho_0 c_p g_2(t)}{j_0^2 A[\rho_{0m}(1+\alpha g_1(t))]^{3/2}}\right]^{-1}\right\}$ | (14-a) |
| $x \ll \delta$ | $d_0 = \sqrt{\frac{\rho_{0m}(1+\alpha g_1(t))}{\pi f_0 \mu_0}}\left\{1 - \left[1 - \frac{\rho_0 c_p g_2(t)\sqrt{9\pi f_0 \mu_0}}{j_0^2 A \rho_{0m}(1+\alpha g_1(t))}\right]^{1/3}\right\}$ | (16) |
| $x \to 0$ | $d_0 = \frac{\rho_0 c_p g_2(t)}{j_0^2 \rho_{0m}(1+\alpha g_1(t))A}$ | (17-a) |

In the quasi-static mode $\Delta T/\Delta t = g_2(t) \to 0$, but $\Delta T/\Delta t = g_2(t) \neq 0$ the relations from Table 1 can be rewritten in the form shown below in Table 2.

TABLE 2

Relations for metal coating thickness determination in quasi-static mode.

| Metal coating thickness to skin depth relation | QUASI-STATIC MODE Relation for thickness determination | Relation # |
|---|---|---|
| $x \approx \delta$ | $d_0 = \frac{1}{2}\sqrt{\frac{\rho_{0m}(1+\alpha g_1(t))}{\pi f_0 \mu_0}} \ln\left\{1 + \frac{2\sqrt{\pi f_0 \mu_0}\,\rho_0 c_p g_2(t)}{j_0^2 A[\rho_{0m}(1+\alpha g_1(t))]^{3/2}}\right\}$ | (14.1-a) |
| $x \ll \delta$ | $d_0 = \frac{\rho_0 c_p g_2(t)}{j_0^2 A \sqrt{\rho_{0m}(1+\alpha g_1(t))}}$ | (16.1) |
| $x \to 0$ | $d_0 = \frac{\rho_0 c_p g_2(t)}{j_0^2 A \rho_{0m}(1+\alpha g_1(t))}$ | (17.1-a) |

Here $g_2(t)$ is meant to be in limit $g_2(t) \to 0$ but it is not actually equal to 0 and still has some small value. In fact, this represents the "close-to steady state" regime, where $g_1(t) \to$ const and $g_2(t) \to\to 0$. Table 2 shows for such case extrapolated relations derived from relations in Table 1 based on Taylor series approximation. In this case the Equation 17-a has an approximation function 17.1-a that is identical to original function, and can not be simplified more.

Figure 3:
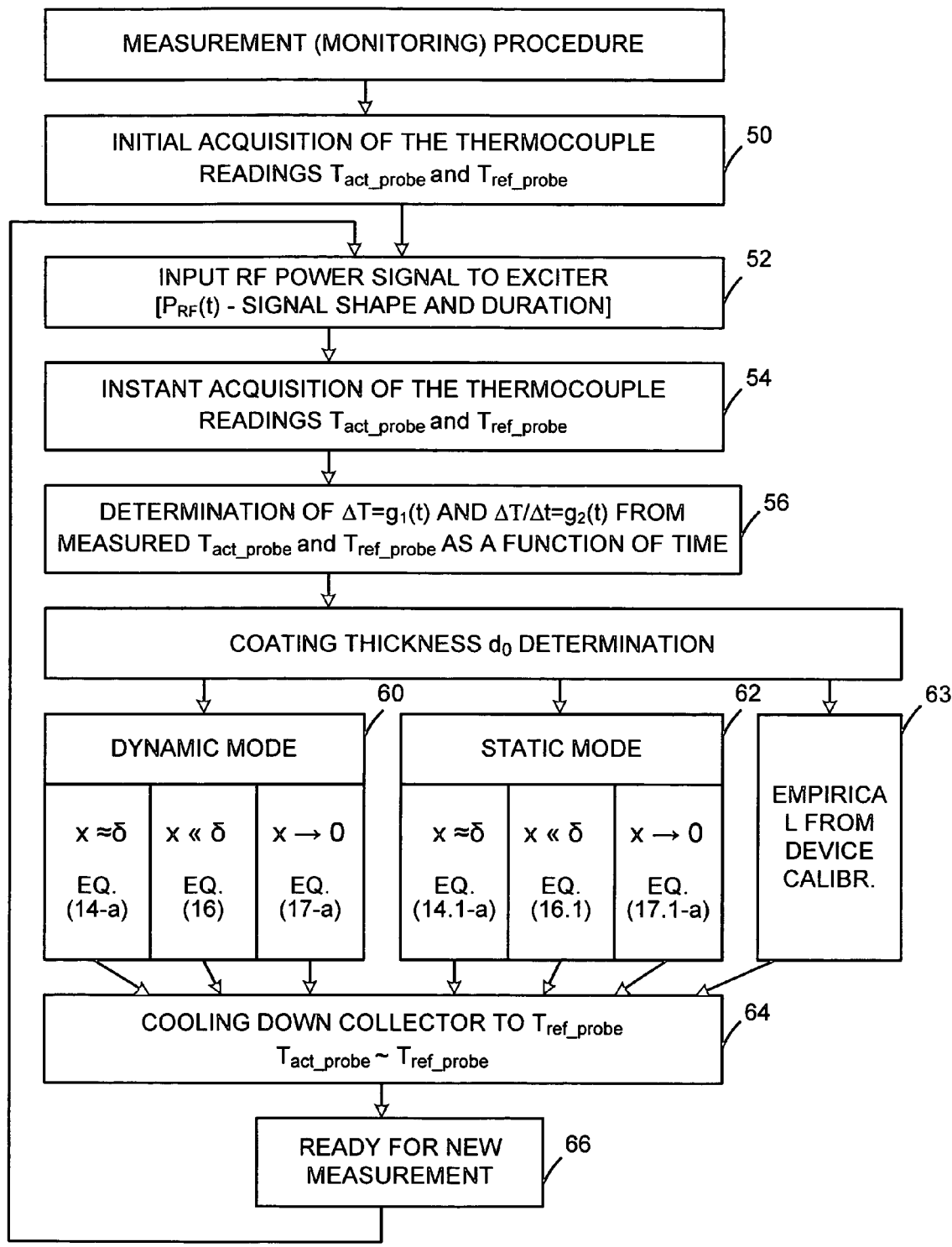
FIG. 3 is a flow chart indicating steps in a method for monitoring and measuring conductive layer thickness.

Steps for monitoring and determining the thickness of the metal (film) being deposited on the collector 34 based on the thermal behavior of the device 10 are illustrated in the flow chart of FIG. 3. In FIG. 3, the thermocouple readings $T_{act\_probe}$ and $T_{ref\_probe}$ refer to the temperature readings measured by thermocouples 38 and 40, respectively, and thus may be considered the temperatures $T_i$ and $T_{ref}$.

Alternatively, an initial calibration with known metal film thickness samples, which will be explained in greater detail in connection with the flow chart of FIG. 4, can be performed to empirically identify ohmic power loss $\psi_{calibration}(d_0, f, \Delta T)$ for the actual device. This can then be used to determine unknown film thicknesses as shown by step 63 in FIG. 3 and as will be explained in connection with the chart of FIG. 5. In this case an experimental calibration curve can be used instead of relations (14-a), (14.1-a), (16), (16.1), (17-a) or (17.1-a) for thickness determination.

With reference to FIG. 3, initial readings from thermocouples 38, 40 are taken at step 50. Power to the exciter 44 is activated at step 52 and instantaneous readings from thermocouples 38 and 40 are acquired at step 54. With reference to equation 13 above, the values of $\Delta T = g_1(t)$ and temperature change rate $\Delta T/\Delta t = g_2(t)$ are determined at step 56 and thereafter the thickness of the coating 48 is determined at step 58 based upon whether the system is proceeding in the dynamic mode 60 or the static mode 62 as described above in connection with equations 14-a, 16 and 17-a or 14.1-a, 16.1 and 17.1-a, respectively. Thereafter, the reference electrode 36, which functions as a heat sink, assists in cooling down the temperature of the collector 34 until the temperatures as measured by the two thermocouples 38 and 40 are essentially the same, at step 64. Thereafter, a new measurement may be taken at step 66 which indicates that the series of measurement steps beginning at step 52 are repeated.

Figure 4:
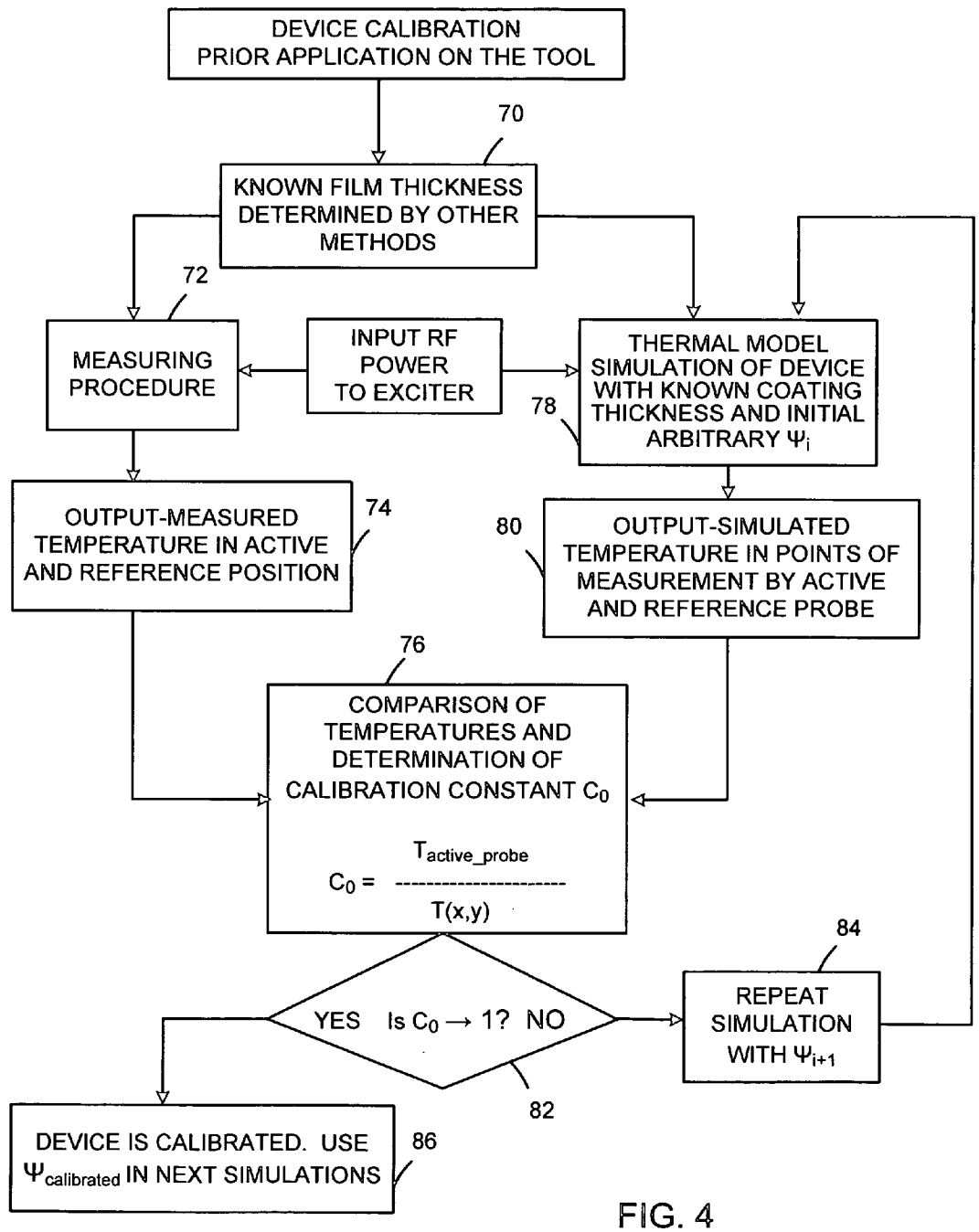
FIG. 4 is a flow chart indicating steps for calibration of the device for monitoring and measuring conductive layer thickness.

FIG. 4 indicates the steps for calibration of the monitoring device 10 prior to the device being used to determine unknown thicknesses. The film thickness is determined initially by other known methods at step 70. Thereafter, there are two generally concurrent paths for the calibration. In one path, temperature measurements are taken as set forth in steps 50 through 56 of FIG. 3, as indicated at step 72. The result or output of the measuring and monitoring procedure, at step 74 is compared at step 76.

The second path includes use of a thermal model simulation at step 78 with a known coating thickness and an initial, function for $\psi_i$ that is given by one of the equations (9), (11) or (12) in dependence on film thickness range (e.g. $x \approx \delta$, $x < \delta$ or $x \to 0$, respectively) and using an estimated value of $\Delta T = T_{active\_probe} - 20$, that means $\psi_i = \psi_i(d_0, f_0, \Delta T) \approx \psi_i(d_0, f_0, T_{active\_probe} - 20)$. The output of the thermal model simulation from step 78 is provided at step 80 as a simulated temperature at the mid-point of the expected measurements of the active and reference probes and the output from step 80 is the second input at the comparator step 76. The result of the comparator step 76 provides a value at step 82, where $T_{active\_probe}$ comes from step 80 and $T(x,y)$ comes from step 74. If this value $c_o$ is not approximating 1, the simulation is repeated at step 84, using a different function $\psi$ at step 84. In other words, if $$\left| c_0 - \frac{T_{active\_probe}}{T(x,y)} \right| > \varepsilon$$

($\varepsilon$ is pre-set error of predictive simulation verified in step 76) then steps 78, 80 and 76 will be repeated with new function $\psi_{i+1}(d_0, f_0, \Delta T)$ which is given by recurring relation $\psi_{i+1}(d_0, f_0, \Delta T) = c_0 \psi_i(d_0, f_0, \Delta T)$. Such iteration will be repeated until condition at step 82 will provide that $$\left| c_0 - \frac{T_{active\_probe}}{T(x,y)} \right| \leq \varepsilon$$

Figure 5:
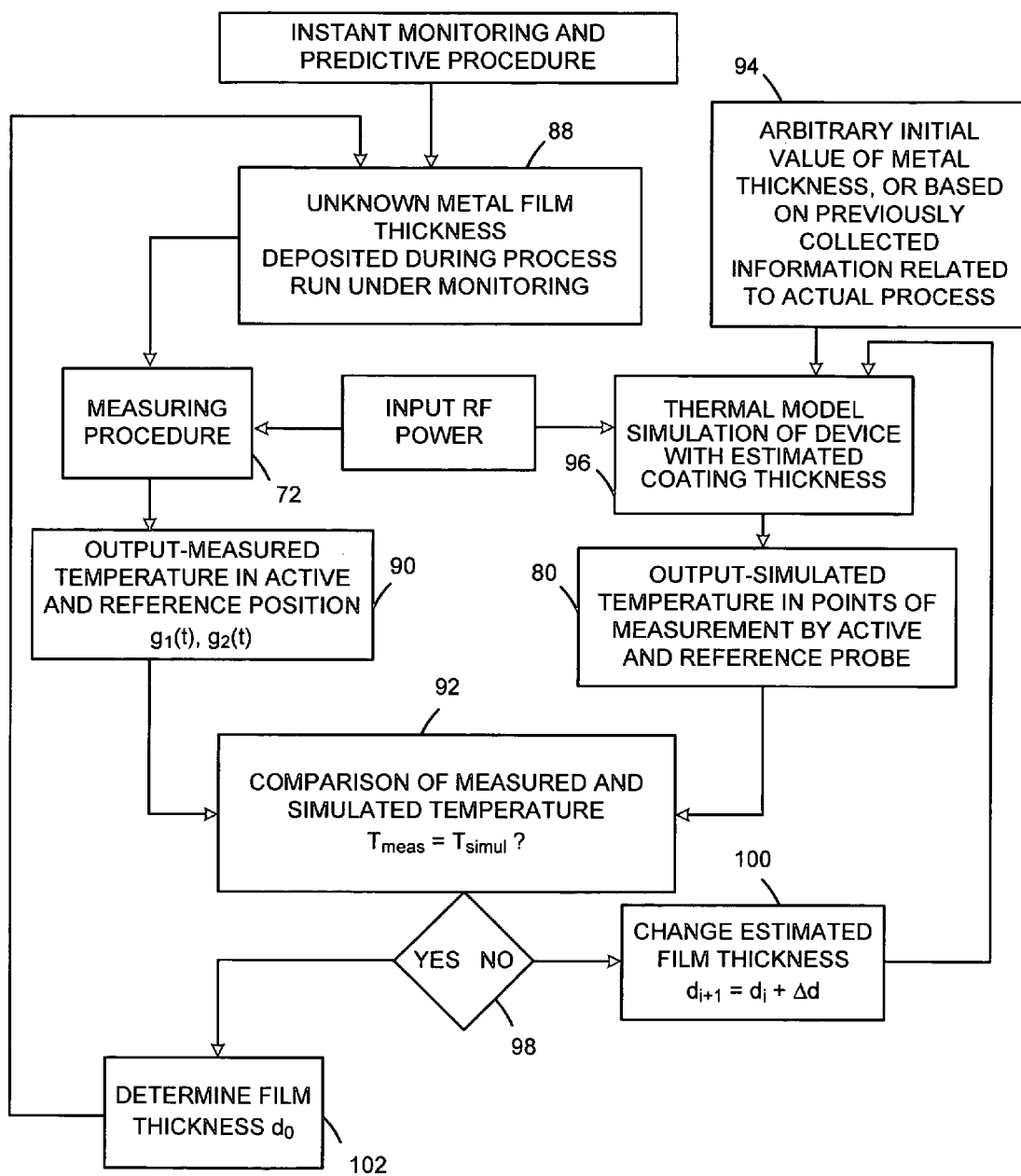
FIG. 5 is a flow chart indicating steps for continuous monitoring and measuring of conductive layer thickness.

(simulation error is less than pre-set simulation accuracy, for example $\varepsilon = 0.01 = 1\%$, i=N-iterations). In this case the comparison at step 82 will yield that calibration is completed in step 86, and the most recent $\psi_N(d_0, f_0, \Delta T)$ is used as calibration function $\psi_{calibration} = \psi_N(d_0, f_0, \Delta T)$ in step 96 (FIG. 5, as described below). In other words, once the output at step 82 is yes, the proper function $\psi$ has been determined as indicated at step 86, and this function will be used to determine unknown thicknesses using the process illustrated in FIG. 5.

Reference should now be had to FIG. 5 for an explanation of the steps for correlation of in-situ monitoring to the thermal model determined in FIG. 4. The method described with respect to FIG. 5 starts with a metal film of unknown thickness at step 88. The temperature measurements as set forth in steps 50 though 56 of FIG. 3 are carried out at step 72. The output of that procedure is obtained at step 90 and presented as one input to a comparator at step 92. Concurrently, starting with either an arbitrary initial value of metal film thickness or a thickness based on previously collected information related to actual process measurements (e.g., the product of the expected metal deposition rate and the length of operation) at step 94, the thermal model from step 86 in FIG. 4 is used in step 96 to determine the expected temperature increase, which is output at step 80. The output of step 80 is presented as the second input to the comparator 92.

The output from comparator 92 is the result of the comparison of the measured temperature and the temperature using the thermal model from step 86 in FIG. 4 with the estimated thickness of the metal layer. If the result of the comparison, at step 98, is that these two values are different, the estimated film thickness was incorrect. Thus, the estimated film thickness is incremented at step 100, and the simulation steps 96 and 80 are repeated. If the result of the comparison step 98 indicates that the measured and simulated temperatures are the same, then at step 102 the metal film thickness is determined, as the value selected at step 94.

It should be noted that the methodology of FIGS. 4 and 5 can also to used in the quasi-static mode described above.

As mentioned above, at a film thickness larger than several skin depths, the ohmic power loss saturates in metal and the resolution of the techniques described above are reduced. However, the ohmic power loss saturation level increases with decreasing frequency. By detecting the saturation temperature at a series of frequency values or at least two frequency values, film thickness can be determine from equation (18) as follows $$U(f_1)=\psi(d_0,f_1,\Delta T_1) \text{ and } U(f_2)=\psi(d_0,f_2,\Delta T_2) \quad (18)$$

Assuming that ohmic power loss is producing proportional increase in temperature, $$\frac{U(f_1)}{U(f_2)} = \frac{\Delta T_1}{\Delta T_2} \quad (19)$$

and from last equation film thickness $d_0$ can be determined as a solution of transcendental equation (20)

$$\Delta T_1 \psi(d_0,f_2,\Delta T_2)=\Delta T_2 \psi(d_0,f_1,\Delta T_1) \quad (20)$$

Function $\psi(d_0, f, \Delta T)$ is given in complete form by relation (9). Also a pre-calibrated set of functions $\psi_{calibration}(d_0, f, \Delta T)$ can be determined as illustrated in FIG. 4. As it was described above in relation to calibration procedure in FIG. 4 using known film thickness either a calibration constant or empirical function $\psi_{calibration}(d_0, f, \Delta T)$ can be determined at a given frequency. This procedure can be repeated for an set of sampling frequencies $\{f_k\}$ to derive set of calibration functions $\{\psi^{calibration,k}(d_0, f_k, \Delta T)\}$. The last ones can then be used to estimate film thickness according to Equation (20). The solution of this equation can be determined by known numerical methods.

A similar approach can be used for a film thickness in range below skin depth (and preferably <1 µm). In this case ohmic power loss does not depend explicitly on the frequency, providing the same heating effect within the thin film. Thus, the ratio in Eq. (19) is equal to 1, and from Eq. (20) it follows $$\psi(d_0,f_2,\Delta T_2)=\psi(d_0,f_1,\Delta T_1) \quad (21)$$

In this case function $\psi(d_0, f, \Delta T)$ is given by relation (11). However, the complete form from relation (9) can also be used.

The foregoing is an exemplary, non-limiting description of the method and apparatus for determining the amount or thickness of the metallic layer deposited during the metallization process on interior chamber walls or interior surfaces within the processing chamber.

The invention claimed is:

1. A method of monitoring the thickness of a generally conductive layer deposited on a collector, comprising:
    applying an electromagnetic field to the conductive layer;
    determining a temperature or a temperature change in the collector as a result of the electromagnetic field; and
    determining the thickness of the generally conductive layer deposited on the collector as a function of the temperature or the change in temperature,
    wherein the thickness determining includes comparing the temperature or the temperature change in the collector with a temperature or a change in temperature calculated from a thermal model using an estimated thickness and adjusting the estimated thickness until the calculated temperature or change in temperature approaches the temperature or change in temperature.

2. The method according to claim 1, wherein the determining of the thickness of the generally conductive layer occurs concurrently with deposition of metal on a workpiece.

3. The method according to claim 1, wherein the generally conductive layer is sputter deposited on the collector.

4. The method according to claim 3, wherein the generally conductive layer is sputter deposited in a metallization chamber.

5. The method according to claim 1, further comprising:
    determining a temperature $T_{ref}$ of a member whose temperature is not affected by said electromagnetic field,
    wherein said thickness determining is based on a difference between the temperature $T_{ref}$ and the temperature in the collector $T_x$ after application of said electromagnetic field.

6. The method according to claim 5, wherein a plurality of different temperatures $T_x$ are measured at different times, and the thickness determining is based on a temperature difference between temperature $T_{ref}$ and at least one of the plurality of different temperatures $T_x$.

7. The method according to claim 6, wherein the plurality of different temperatures is determined on a generally continuous basis.

8. The method according to claim 6, wherein the thickness determining is determined on a generally continuous basis.

9. The method according to claim 6, wherein the thickness of the generally conductive layer is determined in-situ.

10. A method of monitoring the thickness of a generally conductive layer deposited on a collector, comprising:
    applying an electromagnetic field to the conductive layer;
    determining a temperature or a temperature change in the collector as a result of the electromagnetic field; and
    determining the thickness of the generally conductive layer deposited on the collector as a function of the temperature or the change in temperature,
    wherein the application of the electromagnetic field induces ohmic losses on the surface of the collector proportional to the thickness of the conductive layer deposited on the collector.

11. The method according to claim 10, wherein the determining of the thickness of the generally conductive layer occurs concurrently with deposition of metal on a workpiece.

12. The method according to claim 10, wherein the generally conductive layer is sputter deposited on the collector.

13. The method according to claim 12, wherein the generally conductive layer is sputter deposited in a metallization chamber.

14. The method according to claim 10, further comprising:
determining a temperature $T_{ref}$ of a member whose temperature is not affected by said electromagnetic field,
wherein said thickness determining is based on a difference between the temperature $T_{ref}$ and the temperature in the collector $T_x$ after application of said electromagnetic field.

15. The method according to claim 14, wherein a plurality of different temperatures $T_x$ are measured at different times, and the thickness determining is based on a temperature difference between temperature $T_{ref}$ and at least one of the plurality of different temperatures $T_x$.

16. The method according to claim 15, wherein the plurality of different temperatures is determined on a generally continuous basis.

17. The method according to claim 15, wherein the thickness determining is determined on a generally continuous basis.

18. The method according to claim 15, wherein the thickness of the generally conductive layer is determined in-situ.

* * * * *